United States Patent [19]
Goddard et al.

[11] Patent Number: 5,748,516
[45] Date of Patent: May 5, 1998

[54] FLOATING POINT PROCESSING UNIT WITH FORCED ARITHMETIC RESULTS

[75] Inventors: Michael D. Goddard; Kelvin D. Goveas, both of Austin, Tex.

[73] Assignee: Advanced Micro Devices, Inc., Sunnyvale, Calif.

[21] Appl. No.: 533,812

[22] Filed: Sep. 26, 1995

[51] Int. Cl.$^6$ .................................................. G06F 7/00
[52] U.S. Cl. ................................. 364/748.03; 364/736.5
[58] Field of Search ............................. 364/748, 736.5, 364/748.03

[56] References Cited

U.S. PATENT DOCUMENTS

| | | | |
|---|---|---|---|
| 4,161,784 | 7/1979 | Cushing et al. | 364/748 |
| 4,631,696 | 12/1986 | Sakamoto | 364/748 |
| 4,789,956 | 12/1988 | Hildebrandt | 364/736.5 |
| 4,823,260 | 4/1989 | Imel et al. | 364/200 |
| 4,928,223 | 5/1990 | Dao et al. | 364/200 |
| 4,941,120 | 7/1990 | Brown et al. | 364/748 |
| 4,961,161 | 10/1990 | Kojima | 364/736.5 |
| 5,038,313 | 8/1991 | Kojima | 364/736.5 |
| 5,053,631 | 10/1991 | Perlman et al. | 364/748 |
| 5,058,048 | 10/1991 | Gupta et al. | 364/748 |
| 5,095,458 | 3/1992 | Lynch et al. | 364/787 |
| 5,128,888 | 7/1992 | Tamura et al. | 364/748 |
| 5,128,891 | 7/1992 | Lynch et al. | 364/767 |
| 5,155,816 | 10/1992 | Kohn | 395/375 |
| 5,155,820 | 10/1902 | Gibson | 395/375 |
| 5,206,828 | 4/1993 | Shah et al. | 364/784 |
| 5,226,126 | 7/1993 | McFarland et al. | 395/375 |
| 5,257,214 | 10/1993 | Mason et al. | 364/736.5 |
| 5,262,973 | 11/1993 | Richardson | 364/736 |
| 5,339,266 | 8/1994 | Hinds et al. | 364/748 |
| 5,481,489 | 1/1996 | Yanagida et al. | 364/736.5 |
| 5,481,686 | 1/1996 | Dockser | 395/375 |
| 5,499,352 | 3/1996 | Clift et al. | 395/412 |
| 5,574,928 | 11/1996 | White et al. | 395/800 |
| 5,632,023 | 5/1997 | White et al. | 395/394 |
| 5,651,125 | 7/1997 | Witt et al. | 395/394 |

FOREIGN PATENT DOCUMENTS

WO 94/27205  11/1994  WIPO.

OTHER PUBLICATIONS

IBM Technical Disclosure, "Special Case" Arithmetic Handling for IEEE Floating Point Hardware, May 1989, pp. 469–471, vol. 31 No. 12.

IBM Technical Disclosure, FPU Special Case Logic Without Madd Array Dataflow, Nov. 1991, pp. 236–237, vol. 34 No. 6.

IBM Technical Disclosure, Floating Point Bypass Dataflow, Sep. 1994, pp. 545–550, vol. 37 No. 09.

(List continued on next page.)

*Primary Examiner*—David H. Malzahn
*Attorney, Agent, or Firm*—Skjerven, Morrill, MacPherson, Franklin & Friel, L.L.P.; David W. O'Brien

[57] ABSTRACT

Logic for selectively forcing arithmetic results allows a floating point unit to bypass the normal flow through arithmetic units and pipelines depending on the particular floating point operation and operand conditions. Certain forced results (e.g., forced zeros, infinities, and those corresponding to certain invalid operand conditions) may bypass arithmetic units or pipelines and rounding circuitry entirely. On the other hand, other operand dependent results (e.g., the result of X+0 and results of operations involving a NaN operand or operands) may only partially bypass the normal flow. By providing logic for selectively forcing results, arithmetic pipelines may be freed for subsequent instructions in the instruction stream. Logic for selectively forcing arithmetic results may be particularly attractive in a superscalar processor. In a superscalar processor which includes a floating point unit with forced arithmetic results, microcode to handle special cases, pipeline bypass, and early result generation can be avoided because architectural approaches for handling out-of-order results allow dependencies to be resolved irrespective of result reordering. Therefore, the early and out-of-order generation of forced results may be handled by a reorder buffer.

17 Claims, 6 Drawing Sheets

OTHER PUBLICATIONS

Vojin G. Oklobdzija, "An Algorithmic and Novel Design of a Leading Zero Detector Circuit: Comparison with Logic Synthesis", IEEE, ©1994, pp. 124–128.

R.M. Tomsaulo, "An Efficient Algorithm For Exploiting Multiple Arithmetic Units", Jan. 1967, pp. 293–305.

Kai Hwang et al, "Computer Architecture and Parallel Processing", Copyright 1984, pp. 170–174.

Intel, "Microprocessor Family Programmer's Reference Manual", 1992, pp. 15–1 thru 16–28.

IEEE, "IEEE Standard For Radix-Independent Floating-Point Arithmetic", Copyright 1987, pp. 7–16.

IEEE, "IEEE Standard For Binary Floating-Point Arithmetic", Copyright 1985, pp. 7–17.

FLOATING POINT PROCESSING UNIT WITH FORCED ARITHMETIC RESULTS

BACKGROUND OF THE INVENTION

1. Field of the Invention

This invention relates to a floating point processing unit and, more particularly, to a floating point processing unit within a superscalar processor which includes a plurality of functional units.

2. Description of the Relevant Art

As is known in the art, a floating point number may be represented in binary format as an exponent and a mantissa. The exponent represents a power to which a base number such as 2 is raised and the mantissa is a number to be multiplied by the base number. Accordingly, the actual number represented by a floating point number is the mantissa multiplied by a quantity equal to the base number raised to a power specified by the exponent. In such a manner, any particular number may be approximated in floating point notation as $fxB^e$ or (f,e) where f is an n-digit signed mantissa, e is an m-digit signed integer exponent and B is the base number system. In most computer systems, the base number system used is the binary number system where B=2, although some systems use the decimal number system (B=10) or the hexadecimal number system (B=16) as their base number system. Floating point numbers may be added, subtracted, multiplied, or divided and computing structures for performing these arithmetic operations on binary floating point numbers are well known in the art.

In a practical computer, the mantissa portion of a number is not of infinite "precision" (i.e. there are not an unlimited number of digits which may be assigned to the mantissa of a floating point number). Instead, floating point numbers are normally processed in a register with a fixed number of digits. Thus, although two input operands to be added, subtracted, multiplied, or divided may each be exact representations, the result of the operation may create more significant digits than the fixed number of digits in the register. As a result, a less precise (but still accurate) representation of the result must be squeezed into the fixed number of digits in the register by the processes of normalization and rounding.

Normalization is the process which assures that all floating point numbers with the same value have the same representation. Typically, normalization of a binary floating point number is accomplished by shifting the bits of the mantissa to the left until the most significant bit is a one. The exponent is decreased so that the value of the product of the mantissa and base number raised to the power of the exponent remains constant. Since the most significant bit in the mantissa of a normalized number is always a one, floating point representations often represent the bit implicitly (effectively freeing up one bit position for use as an additional bit of precision). Together these significant bits, whether they include an explicit or an implicit most significant bit, are known as the significand. The normalization process maximizes the number of significant bits represented in this significand.

Rounding a floating point number is the process of reducing the precision of a number, so as to fit a representation of the number into a smaller number of significand bits. For floating point number representations, four rounding modes are typical: round up, round down, round to nearest, and truncate (see Dewar, *Microprocessors: A Programmer's View*, McGraw-Hill Publishing Co., New York, 1990, pp. 140–143 for a discussion).

The finite number of digits in the exponent also places limits on the magnitude of numbers which can be represented. Arithmetic results which exceed these limits are known as underflow and overflow. There are two ranges of numbers that correspond to arithmetic overflow and arithmetic underflow, respectively. If the result of an arithmetic operation is greater than the largest positive value representable or less than the most negative value representable, arithmetic overflow occurs. On the other hand, when the result of arithmetic operation is too small to be expressed, either positive or negative arithmetic underflow has occurred.

ANSI IEEE Standard 754, which is incorporated herein by reference, establishes standards for binary floating point number representations and arithmetic operations. Illustratively, FIG. 1A shows a floating point format which meets the minimum requirements of ANSI IEEE Standard 754 for the representation of extended double-precision floating point numbers (hereinafter extended-precision format). In accordance with the IEEE standard, a "significand" field of sixty-four (64) bits and a biased exponent field of fifteen (15) bits are provided in the extended-precision format. The most significant bit of the significand field is an explicit representation of the bit which appears to the left of implied binary point 11 while the remaining 63 bits represent bits to the right of implied binary point 11. Thus, the significand 1011x, where x signifies the remaining 60 bits (each equal to "0"), represents a mantissa equal to 1.011 binary (or 1.375 decimal). For normalized numbers, the left most bit is always a "1." In addition to the significand and exponent fields, a one bit sign field, "s," indicates the sign of a represented floating point number.

Other commonly used floating point formats defined by ANSI IEEE Std. 754 include the single- and double-precision formats. In contrast with the extended-precision format, single- and double-precision formats implicitly represent a so called "hidden" bit corresponding to the bit just left of the binary point. In this way, the full width of the significand field is used for representing bits to the right of the binary point. This hidden bit representation increases the precision of representable numbers by one bit. A single-precision floating point number (as defined by the IEEE standard) is represented as a one-bit sign field, an eight-bit biased exponent, and a 23-bit significand (see FIG. 1B). A double-precision floating point number (also as defined by the IEEE standard) increases the width of the biased exponent field to eleven (11) bits and the width of the significand to fifty-two (52) bits (see FIG. 1C).

ANSI IEEE Std. 754 defines binary floating point operations in special arithmetic situations. The related ANSI IEEE Std. 854, which is incorporated herein by reference, defines these floating point operations in a radix-independent form. Typical modern floating point processors are implementations of these IEEE standards. For example, the i387™ and the floating point unit of the widely used i486™, both available from Intel Corporation of Santa Clara, Calif., are substantially compliant with ANSI IEEE Stds. 754 and 854 (see Intel, Intel486 Programmer's Reference Manual, 1992, pp. 16-1 to 16-28).

The ANSI IEEE standards define the result of arithmetic operations in situations where one or more of the operands is a special numeric value and in numeric exception situations. Special numeric values include zero, positive and negative infinity, and not a number (NaN) values (see ANSI IEEE Std. 754, pp. 13-14 and ANSI IEEE Std. 854, p. 13). Floating point operations and operand values may generate numeric exception conditions (e.g., an invalid operation or a divide-by-zero exception), each of which may be masked or unmasked. An exception is masked when the floating point unit is configured to continue processing despite the exception and a reasonable result value is defined for the operation. Reasonable results for operations which generate numeric exceptions are defined by the IEEE standards (see ANSI IEEE Std. 754, pp. 14–15 and ANSI IEEE Std. 854, pp. 13–15). Masked divide-by-zero exceptions generate a result equal to plus or minus infinity, where the sign is equal to the exclusive OR (XOR) of the signs of operands.

To maximize computational throughput, a number of superscalar techniques have been proposed to enable instruction-level parallelism using multiple functional units. Instruction parallelism can be described as the opportunity for simultaneous (parallel) execution of more than one instruction in a processor having multiple functional units. Pipelining techniques involve exploitation of instruction parallelism within a single functional unit, whereas superscalar techniques involve the exploitation of instruction parallelism across more than one functional unit. The instruction parallelism exploited by superscalar techniques may be contrasted with data parallelism in that superscalar techniques enable the parallel execution of dissimilar instructions, not just identical instructions with independent operands. These techniques, which are known in the art of superscalar processor design, include out-of-order instruction issue, out-of-order instruction completion, and speculative execution of instructions.

Out-of-order instruction issue involves the issuance of instructions to functional units with little regard for the actual order of instructions in executing code. A superscalar processor which exploits out-of-order issue need only be constrained by dependencies between the output (results) of a given instruction and the inputs (operands) of subsequent instructions in formulating its instruction dispatch sequence. Out-of-order completion, on the other hand, is a technique which allows a given instruction to complete (e.g., store its result) prior to the completion of an instruction which precedes it in the program sequence. Finally, speculative execution involves the execution of an instruction sequence based on predicted outcomes (e.g., of a branch). Speculative execution (i.e., execution under the assumption that branches are correctly predicted) allows a processor to execute instructions without waiting for branch conditions to actually be evaluated. Assuming that branches are predicted correctly more often than not, and assuming that a reasonably efficient method of undoing the results of an incorrect prediction is available, the instruction parallelism (i.e., the number of instructions available for parallel execution) will typically be increased by speculative execution (see Johnson, *Superscalar Processor Design*, Prentice-Hall, Inc., New Jersey, 1991, pp. 63–77 for an analysis).

Architectural designs for exploiting the instruction parallelism associated with each of these techniques have been proposed in a variety of articles and texts. For a discussion, see Johnson, pp. 127–146 (out of order issue), pp. 103–126 (out-of-order completion and dependency), pp. 87–102 (branch misprediction recovery).

One architectural approach for exploiting instruction parallelism is the reorder buffer. A reorder buffer is a content-addressable store which maintains the speculative (i.e., out-of-order) state of registers in a processor which includes multiple functional units. When each instruction is decoded, a reorder-buffer entry is allocated to store the instruction's result and a temporary identifier, or tag, is created to identify the result. In a normal instruction sequence, a given register may be written many times and therefore multiple reorder buffer entries will be allocated, corresponding to the state of the register at different points in the instruction sequence. As instructions which require register values as operands are dispatched, the most recently allocated reorder buffer entry is referenced, or if no reorder buffer entry corresponds to the required register location, the value stored in the register file is used. Assuming that a corresponding reorder buffer entry has been allocated, the value of an operand required by a given instruction is supplied by the reorder buffer if the instruction which computes the operand value has completed; otherwise, a tag is supplied which allows the instruction to recognize the result when it becomes available. A superscalar processor design which incorporates a reorder buffer also provides facilities to retire reorder buffer entries (i.e., store the entry value to the register file or discard the entry if no longer needed).

A reorder buffer implementation facilitates out-of-order completion using a technique known as register renaming. Register renaming eliminates instruction output dependencies resulting from storage conflicts by allocating multiple instances of an output register. A register instance so allocated is identified by a unique tag, as before. The multiple independent instances of register R0, illustratively, $R0_1$ and $R0_2$, allow otherwise independent instructions, where each such instruction stores its result to register R0, to store their results independently (i.e., out-of-order) despite an apparent output conflict for R0. Instruction 1 stores its result to $R0_1$, while instruction 2 stores to $R0_2$. Using tags to identify the register instances, rather than the architectural register name, R0, the reorder buffer effectively "renames" register references and sidesteps the output contention. Instructions which depend on the output of a prior instruction reference use renamed registers ($R0_1$ and $R0_2$), rather than R0, according to the true data dependencies in the instruction sequence. See Johnson, pp. 48–50, 92–94 for discussions of register renaming and reorder buffer implementation. A superscalar processor implementing register renaming allows instructions to complete out-of-order.

SUMMARY OF THE INVENTION

An advantage of the present invention is the bypass of normal flow through arithmetic units and pipelines in a floating point functional unit. Predetermined combinations of instructions and operands trigger arithmetic unit bypass and forced result generation. By providing logic for selectively forcing results, the present invention allows arithmetic pipelines to be freed for execution of subsequent instructions in the instruction stream. Logic for selectively forcing arithmetic results is particularly attractive in a superscalar processor. In a superscalar processor which includes a floating point unit with forced arithmetic results, microcode to handle special cases, pipeline bypass, and early result generation can be avoided because architectural approaches for handling out-of-order results allow dependencies to be resolved irrespective of result ordering.

These and other advantages are realized in the present invention, which in one embodiment includes an arithmetic unit, forced result logic, operand characterization logic, and control logic. The arithmetic unit is coupled to a floating point operand source and to a result bus, and is responsive to a normal result indication. Forced result logic is also coupled to the floating point operand source and result bus, and is responsive to a forced result indication. Control logic is coupled to the operand characterization logic, to the floating point instruction source, to the arithmetic unit, and to the forced result logic. The control logic supplies the forced result indication in response to predetermined combinations of floating point instructions and operand characterizations.

In another embodiment, the forced result logic includes operand passing logic and predetermined result forcing logic, and the forced result indication includes a pass operand indication and a force predetermined result indication. The operand passing logic includes an arithmetic unit bypass path coupled between the floating point operand source and the result bus and is responsive to the pass operand indication. The predetermined result forcing logic is coupled to the result bus and is responsive to the force predetermined result indication. In yet another embodiment, the present invention further includes rounding logic coupled between the operand passing logic and the result bus and between the arithmetic unit and the result bus. The rounding logic rounds operands passed via the arithmetic unit bypass path in accordance with a result format and a rounding mode. In yet another embodiment, the predetermined result forcing logic is integrated with the rounding logic.

BRIEF DESCRIPTION OF THE DRAWINGS

The present invention may be better understood, and its numerous objects, features, and advantages become apparent to those skilled in the art by referencing the accompanying drawings in which.

DETAILED DESCRIPTION OF THE INVENTION

Figure 2:
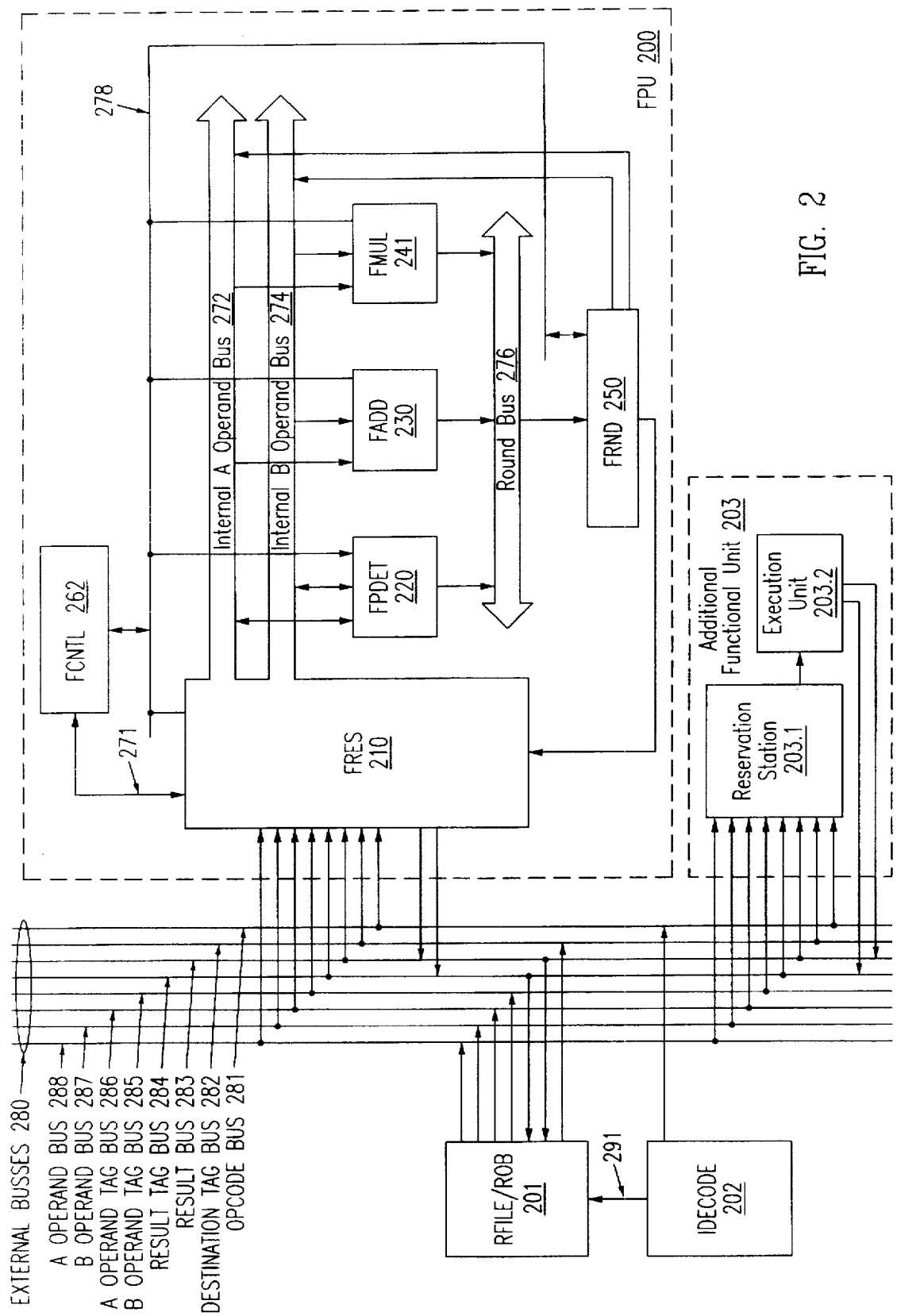
FIG. 2 is a block schematic diagram of a floating point unit incorporating a forced result generation logic constructed in accordance with the teachings of the present invention.

FIG. 2 depicts a floating point arithmetic unit, FPU 200, for a superscalar processor. The FPU 200 includes a reservation station, FRES 210; control logic, FCNTL 262; a predetect unit, FPDET 220; two arithmetic units (an addition pipeline, FADD 230 and a multiplication pipeline, FMUL 241); and a rounding unit, FRND 250. Additionally, FPU 200 includes three internal busses (an internal A operand bus 272, an internal B operand bus 274, and a rounding bus 276). FIG. 2 also depicts an additional functional unit 203. Functional unit 203 is representative of additional functional of units any type (e.g., an integer, branch, load/store, or other functional unit) which may be included in a superscalar processor architecture. Alternatively, functional unit 203 could represent another floating point arithmetic unit. The functional unit 203 incorporates a reservation station 203.1 and execution unit 203.2. Functional unit 203 interacts with instruction decode logic, IDECODE 202, with the register file/reorder buffer, RFILE/ROB 201, and with other functional units in the manner now described for the FPU 200. Typically, several such units would be included in a superscalar processor architecture.

Opcodes for each floating point instruction are dispatched from an instruction decode unit, IDECODE 202 to the FRES unit 210 of FPU 200, via an opcode bus 281. Similarly, operand data and tags for a given floating point operation (i.e., those corresponding to a dispatched opcode) are provided by RFILE/ROB 201, to the FRES unit 210 of FPU 200 via external operand and tag busses. FIG. 2 depicts the external A and B operand busses (288 and 287) and the A and B operand tag busses (286 and 285). If operand data is available on instruction dispatch (e.g., if the data resides in the RFILE/ROB) then the operand data is sent from the RFILE/ROB 201 to FRES 210 over the lines of the appropriate external operand bus (i.e., the external A operand bus 288 for an A operand and the external B operand bus 287 for a B operand). If instead, an operand is not yet available (i.e., if it represents the result of a pending instruction), then an operand tag is provided by RFILE/ROB 201 to FRES 210. This tag is provided over the appropriate operand tag bus (286 or 285) and allows FRES 210 to later receive the results of the pending operation as an operand. A and B operands are independent in that one operand may be available and is therefore sent on the appropriate external operand bus (288 or 287), while the other may represent the result of a pending operation and an operand tag is dispatched instead over the appropriate operand tag bus (286 or 285).

FRES 210 also receives a destination tag for each floating point instruction via destination tag bus 282. This destination tag, which is driven onto destination tag bus 282 by the RFILE/ROB 201, is later posted by FRES 210 as a result tag on the result tag bus 284 when the result of the corresponding floating point instruction is written to result bus 283. FRES 210 receives, via result bus 283, the results of instructions which were pending (and whose results were therefore unavailable) when a given instruction was dispatched to FPU 200.

Functional units within the superscalar processor architecture disclosed (i.e., FPU 200 and additional functional units such as 203) each post a result value and an identifying result tag on the group 280 of external busses. Such a result tag may be posted either during the same bus cycle as the result value, or during an earlier bus cycle if the bus arbitration scheme so supports. By comparing the result tag on result tag bus 284 with operand tags for pending floating point instructions received and temporarily stored in FRES registers, FRES 210 recognizes results which correspond to operands of these pending instructions. FRES 210 in-gates the value appearing on result bus 283 on a tag match.

FRES 210 is of any suitable design. Reservation station designs are well known in the art; see for example, Tomasulo, "An Efficient Algorithm for Exploiting Multiple Execution Units," IBM Journal, vol. 11, January 1967, pp. 25–33, which discloses a floating point processor implementation which includes multiple functional units, each with a reservation station. Tomasulo used the term "execution unit" rather than "functional unit," but in this context the concept is similar. A suitable reservation station is disclosed in a co-pending patent application Ser. No. 08/533,725, entitled "Reservation Station for a Floating Point Processing Unit" and naming Goddard et al. as inventors, filed on 26 Sep. 1995, and incorporated herein by reference.

FPU 200 includes at least one arithmetic unit. In the embodiment described herein, two arithmetic units are included in FPU 200: an addition pipeline, FADD 230 and a multiplication pipeline, FMUL 241. Alternate collections of arithmetic units are also possible. For example, arithmetic units configured for division, square root, trigonometric, or transcendental functions could be included, specialized units for normalization or floating point format conversion could be incorporated, and multiple instances of a given arithmetic unit type could be provided. Furthermore, in a superscalar processor incorporating multiple floating point units (e.g., FPU 200 and additional functional unit(s) 203), individual floating point units may incorporate similar or dissimilar collections of arithmetic units.

The floating point multiplication pipeline 241 depicted in FIG. 2 is of any suitable design. Pipelined floating point multipliers are well known in the art and are described in many texts and articles; see for example, Hwang and Briggs, *Computer Architecture and Parallel Processing*, McGraw-Hill Book Company, New York, 1984, pp. 170–174.

The floating point addition pipeline, FADD 230, is configured to perform floating point addition and to provide shared operand normalizing logic. Suitably configured adders and normalizing logic are well known in the art. A suitable addition pipeline configured to perform floating point addition and to provide normalizing logic for normalizing denormal operands prior to their submission to a floating point arithmetic unit is disclosed in U.S. Pat. No. 5,058,048, "Normalizing Pipelined Floating Point Processing Unit" to Gupta et al., and is incorporated herein by reference.

In the embodiment of FIG. 2, FRES 210 buffers each floating point instruction and its associated operands until two conditions are met. First, the requisite floating point arithmetic unit must be available, and second, A and B operands must both be ready (i.e., operand tag references, if any, must be resolved). Each of the floating point arithmetic units (FADD 230 and FMUL 241) receives its operands from busses 272 and 274 and calculates a result which the unit drives onto round bus 276. A rounding unit, FRND 250, receives these results from round bus 276 and rounds the result in accordance with any of the four rounding modes specified by ANSI IEEE standard 754. FRND 250 drives a rounded floating point result back to FRES 210, which in turn drives it onto the result bus 283. Coincident with this output, FRES 210 also drives the corresponding result tag onto result tag bus 284, although alternate timings are possible if the bus scheme so supports.

In the embodiment of FIG. 2, FCNTL 262 maintains a store of destination tags received from FRES 210 (one destination tag for each floating point instruction). FCNTL 262 propagates these destination tags through a series of latches which correspond to the internal stages of the arithmetic and non-arithmetic units within the FPU (i.e., FADD 230, FMUL 241, FPDET 220, and FRND 250). In this way, the propagation of tags through FCNTL latches corresponds to the processing of operands in various stages of the units. As a rounded result is provided to FRES 210 by FRND 250, FCNTL 262 supplies the corresponding destination tag. FRES 210 then drives the tag onto the result tag bus 284 as a result tag.

Floating point result values driven onto result bus 283 by FRES 210 are received by the RFILE/ROB 201 and stored in a RFILE/ROB location according to the tag value appearing on result tag bus 284. In addition, a floating point result value driven onto result bus 283 may also be in-gated by the reservation station of other functional units (illustratively reservation station 203.1 of additional functional unit 203) if the result tag on result tag bus 284 corresponds to an operand tag for an instruction in the reservation station of the functional unit. In the embodiment of FIG. 2, a floating point result which corresponds to an operand required for the next instruction is generally driven onto result bus 283 and internally fast-forwarded directly onto an internal operand bus (272 or 274). Such results are therefore not in-gated by FRES 210. However, where the both the A and B operands of the next instruction are represented by as yet unresolved operand tags or where the FRES 210 includes multiple buffer entries, floating point results may be received via result bus 283. See the co-pending patent application Ser. No. 08/533,725, entitled "Reservation Station for a Floating Point Processing Unit" for a more detailed description of FRES 210.

Like the floating point arithmetic units (FADD 230 and FMUL 241), FPDET 220 receives the A and B operands driven onto the internal A and B operand busses 272 and 274 by FRES 210. FPDET 220 characterizes the A and B operands received and provides FCNTL 262 with a characterization of each. For each A and B operand presented on internal operand busses 272 and 274, FPDET 220 detects zero, infinity, not a number (NaN), denormal operand, and unsupported format conditions. In addition, FPDET 220 detects operand conditions corresponding to the comparative values of A and B operands presented on internal operand busses 272 and 274 (e.g., $[A_{significand} > B_{significand}]$ or $[B_{significand} > A_{significand}]$.

Detected condition signals are provided to control logic, FCNTL 262, over a series of control lines represented collectively as control bus 278. Based on operand conditions so detected, FCNTL 262 drives control signals over the lines of control bus 278 to an arithmetic execution unit (e.g., FADD 230 or FMUL 241) or units, to FPDET 220, and to FRND 250. Receipt of detected condition signals and distribution of control signals need not be via a fully connected bus structure. Other structures, including discrete, point-to-point lines, are suitable and the collection of control lines (control bus 278) is presented as a bus structure in FIG. 2 for ease of representation. Control signals driven to an arithmetic execution unit via control bus 278 set up the unit for a floating point operation on the particular A and B operand values presented on busses 272 and 274. These control signals also inhibit the operation of the arithmetic unit (i.e., indicate that the arithmetic unit should not generate a result on round bus 276 when a forced arithmetic result is triggered).

In the embodiment disclosed in FIG. 2, operand conditions detected by FPDET 220, such as zero operands, infinity operands, and not a number (NaN) operands, may trigger forced arithmetic results. Depending on the floating point operation (e.g., add, multiply, divide, etc.) and the particular operand condition detected, arithmetic results may be forced by either FPDET 220 or FRND 250, thereby bypassing the normal flow through the arithmetic units (FADD 230 or FMUL, 241). Tables 1–3 summarize the combinations of operations and operand conditions which trigger forced arithmetic results. In particular, Table 1 lists forced results triggered for combinations of floating point operations and zero operand conditions. Table 2 similarly lists forced results for infinity operand conditions. Table 3 specifies forced results for NaN operand conditions.

TABLE 1

Zero Operands and Forced Results

| Operation | Operands | Result | Forced By |
|---|---|---|---|
| Load Real, Load Binary Coded Decimal | ±0 | *0 | FRND |
| Load Integer | +0 | +0 | FRND |
| Store Real, Round to Integer | ±0 | *0 | FRND |
| Store Binary Coded Decimal | ±0 | *0 | FRND |
| Store Integer | ±0 | *0 | FRND |
| Change Sign | +0 | −0 | FRND |
| | −0 | +0 | FRND |
| Absolute Value | ±0 | +0 | FRND |
| Addition | +0 plus +0 | +0 | FRND |
| | −0 plus −0 | −0 | FRND |
| | +0 plus −0, −0 plus +0 | ±0$^2$ | FRND |
| | ±0 plus ±X, ±X plus ±0 | #X | FPDET |
| Subtraction | +0 minus −0 | +0 | FRND |
| | −0 minus +0 | −0 | FRND |
| | +0 minus +0, −0 minus −0 | ±0$^2$ | FRND |
| | +X minus +X, −X minus −X | ±0$^1$ | FRND |
| | ±0 minus ±X | −#X | FPDET |
| | ±X minus ±0 | #X | FPDET |
| Multiplication | ±0 × ±0 | 0 | FRND |
| | ±0 × ±X, ±X × ±0 | 0 | FRND |
| Division | ±0 ÷ ±0 | Invalid Operation | FRND |
| | ±X ÷ ±0 | ∞ (Zero Divide) | FRND |
| | ±X ÷ ±∞ | 0 | FRND |
| | +0 ÷ +X, −0 ÷ −X | +0 | FRND |
| | +0 ÷ −X, −0 ÷ +X | −0 | FRND |
| Partial Remainder | ±0 rem ±0 | Invalid Operation | FRND |
| | ±X rem ±0 | Invalid Operation | FRND |
| | +0 rem ±X | +0 | FRND |
| | −0 rem ±X | −0 | FRND |
| Square Root | ±0 | *0 | FRND |
| Scale | ±0 scaled by −∞ | *0 | FRND |
| | ±0 scaled by +∞ | Invalid Operation | FRND |
| | ±0 scaled by X | *0 | FRND |

X denote nonzero positive operands.
$^1$Sign determind by rounding mode: + for nearest, up, or truncate, − for down.
* Sign of original zero operand.
Sign of original X operand.

TABLE 2

Infinity Operands and Forced Results

| Operation | Operands | Result | Forced By |
|---|---|---|---|
| Load Real, Load Binary Coded Decimal | ±∞ | *∞ | FRND |
| Store Real, Round to Integer | ±∞ | *∞ | FRND |
| Change Sign | +∞ | −∞ | FRND |
| | −∞ | +∞ | FRND |
| Absolute Value | ±∞ | +∞ | FRND |
| Addition | +∞ plus +∞ | +∞ | FRND |
| | −∞ plus −∞ | −∞ | FRND |
| | +∞ plus −∞ | Invalid Operation | FRND |
| | −∞ plus +∞ | Invalid Operation | FRND |
| | ±∞ plus ±X | *∞ | FRND |
| | ±X plus ±∞ | *∞ | FRND |
| Subtraction | +∞ minus −∞ | +∞ | FRND |
| | −∞ minus +∞ | −∞ | FRND |
| | +∞ minus +∞ | Invalid Operation | FRND |
| | −∞ minus −∞ | Invalid Operation | FRND |
| | ±∞ minus ±X | *∞ | FRND |

TABLE 2-continued

Infinity Operands and Forced Results

| Operation | Operands | Result | Forced By |
|---|---|---|---|
| | ±X minus ±∞ | −*∞ | FRND |
| Multiplication | ±∞ times ±∞ | ∞ | FRND |
| | ±∞ times ±Y, ±Y times ±∞ | ∞ | FRND |
| | ±0 times ±∞, ±∞ times ±0 | Invalid Operation | FRND |
| Division | ±∞ ÷ ±∞ | Invalid Operation | FRND |
| | ±∞ ÷ ±X | ∞ | FRND |
| | ±X ÷ ±∞ | 0 | FRND |
| | ±∞ ÷ ±0 | ∞ | FRND |
| Partial Remainder | ±∞ rem ±∞ | Invalid Operation | FRND |
| | ±∞ rem ±X | Invalid Operation | FRND |
| | ±X rem ±∞ | $X | FPDET |
| Square Root | −∞ | Invalid Operation | FRND |
| | +∞ | +∞ | FRND |
| Scale | ±∞ scaled by −∞ | Invalid Operation | FRND |
| | ±∞ scaled by +∞ | *∞ | FRND |
| | ±∞ scaled by ±X | *∞ | FRND |
| | ±0 scaled by −∞ | ±0$^1$ | FRND |
| | ±0 scaled by ∞ | Invalid Operation | FRND |
| | ±X scaled by +∞ | #∞ | FRND |
| | ±X scaled by −∞ | #0 | FRND |

X Zero or nonzero positive operand.
* Sign of original infinity operand.
$ Sign of original operand.
Exclusiver OR of signs of operands.
Sign of original operand.
$^1$Sign of original zero operand.

TABLE 3

NaN Operands and Forced Results

| Operation/Operands | Result | Forced By |
|---|---|---|
| Floating point operation on an SNaN and a QNaN. | The QNaN operand. | FPDET |
| Floating point operation on two SNaNs. | The QNaN that results from converting the SNaN that has the larger significand. | FPDET |
| Floating point operation on two QNaNs. | The QNaN that has the larger significand. | FPDET |
| Floating point operation on an SNaN and another number. | The QNaN that results from converting the SNaN. | FPDET |
| Floating point operation on a QNaN and another number. | The QNaN. | FPDET |
| Invalid operation that does not involve NaNs. | QNaN real indefinite. | FRND |

Each table indicates the logic block (FPDET 220 or FRND 250) which forces the result in the embodiment described herein. For example, in Table 1, an addition operation on A and B operands equal to −0 and −0 generates a result of −0, which in the embodiment disclosed herein, is forced by FRND 250. Alternate sets of triggering combinations and alternate mappings of the forcing function to logic blocks are also possible.

Figure 1A:
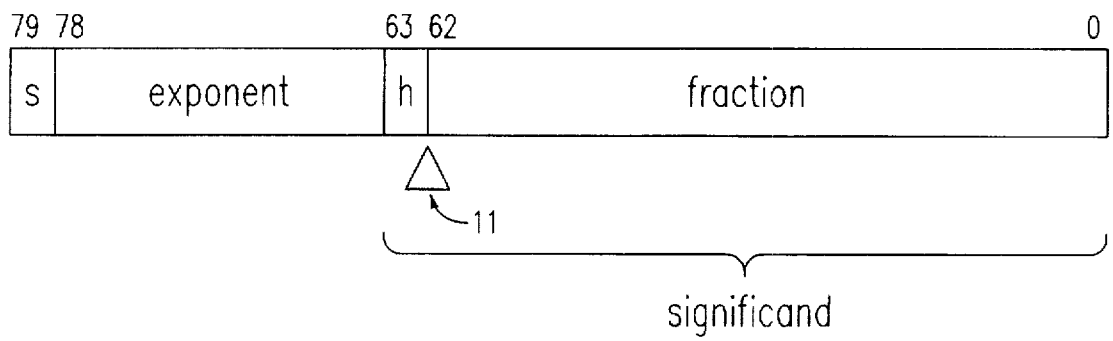
FIG. 1A is a pictorial illustration of the format of an extended-precision floating point number.
Figure 1B:
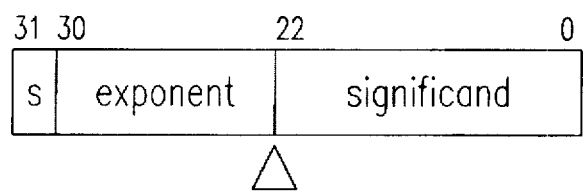
FIG. 1B is a pictorial illustration of the format of an single-precision floating point number.
Figure 1C:
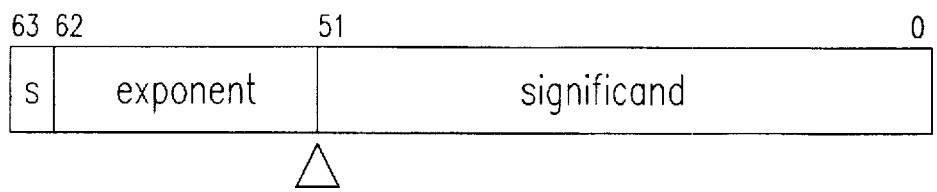
FIG. 1C is a pictorial illustration of the format of an double-precision floating point number.
Figure 3:
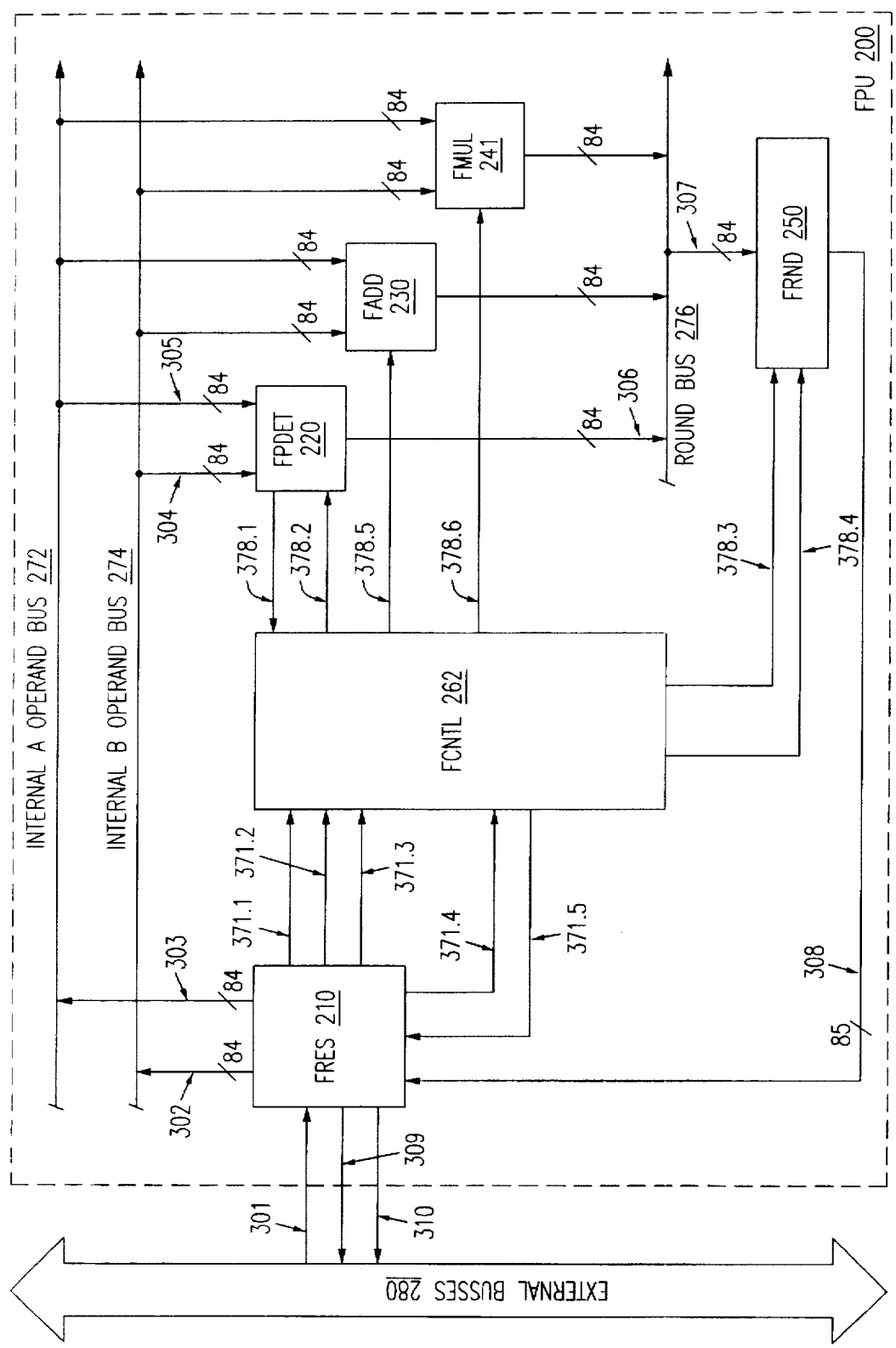
FIG. 3 is a block schematic diagram of forced result generation logic constructed in accordance with the teachings of the present invention.
Figure 6:
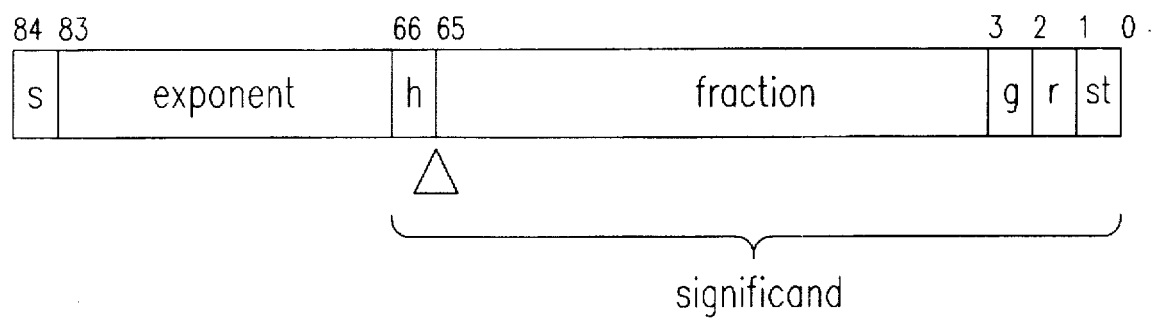
FIG. 6 is a pictorial illustration of the format of an internal, extended-precision floating point number.

Forcing of arithmetic results is now described referring to FIG. 3. FRES 210 drives A and B operands onto internal A and B operand busses 272 and 274 in accordance with an 85-bit, internal extended-precision format shown in FIG. 6, although alternate internal formats would also be suitable. The internal extended-precision format, provides additional bits for representing exponents and significands as compared with the single-, double-, and extended-precision formats of FIGS. 1B, 1C, and 1A. Seventeen (17) bits of biased exponent, sixty-seven (67) bits of significand, and a singlebit sign field are provided. Within the significand, an explicit hidden bit ("h") is also provided such that the binary point for a normalized floating point value falls between the hidden bit and the 63-bit fraction. Finally, three additional bits (a guard bit, "g;" a round bit, "r;" and a sticky bit, "st") allow floating point results to be rounded exactly (by FRND 250) to a either an internal-precision or lesser precision external format, i.e., rounded as if the internal format was of infinite precision.

Referring back to FIG. 3, internal A and B operand busses 272 and 274 are shown as 84-bit busses. The sign bit of an operand is not represented on 272 and 274 and is therefore not provided to FPDET 220 or to the arithmetic units (FADD 230 and FMUL 241). Instead, the sign bit of each operand is provided by FRES 210 to FCNTL 262 via a pair of lines 371.1 and 371.2. FCNTL 262 determines the sign of an arithmetic result and provides the result sign directly to FRND 250 via line 378.4. Round bus 276 also eliminates the sign bit, since the sign bit is directly provided to FRND 250.

FPDET 220 receives and characterizes operands driven onto internal A and B operand busses 272 and 274 by FRES 210. Operand conditions are detected by FPDET 220 and an indication of operand conditions so detected is provided to FCNTL 262 via line 378.1. FCNTL 262 also receives the opcode for the operation to be performed on A and B operands from FRES 210 via line 371.1. Depending on the particular combination of operation (as represented by the opcode indication on line 371.1) and operands (as represented by operand conditions indicated on line 378.1 and operand signs indicated on lines 371.2 and 371.3), FCNTL 262 drives control signals to FPDET 220 and FRND 250 via lines 378.2 and 378.3, respectively. In addition, FCNTL 262 provides control signals to each of the arithmetic units (FADD 230 and FMUL 241) via lines 378.5 and 378.6, respectively.

Forced zeros and infinities (i.e., +0, −0, +∞, −∞) and forced real indefinite values are provided directly by FRND 250 while other forced results, including NaNs and values equal to either the A or the B operand, are provided by FPDET 220 and are subsequently rounded by FRND 250. In the case of forced zeros and infinities, control signals provided by FCNTL 262 via line 378.3 select the value to be forced by FRND 250. In addition, a result sign indication provided by FCNTL 262 on line 378.4 identifies the sign of the forced result. The forced result so identified is driven onto result bus 283 by FRND 250 via line 308. Forced zeros and infinities thus bypass both the arithmetic units (FADD 230 and FMUL 241) and round bus 276.

Arithmetic results are also forced by FPDET 220 in response to control signals received from FCNTL 262 via line 378.2. The results forced by FPDET 220 (rather than FRND 250) are those which are dependent on the actual value of an operand. For example, the result of an addition (or subtraction) of ±0 to (from) X is X, where X is any valid, non-zero operand value. In addition, the propagation of diagnostic information requires that information coded in NaN operands be preserved through arithmetic operations and floating point format conversions (see ANSI IEEE Std. 754, p. 13 and ANSI IEEE Std. 854, p. 13). Thus results of operations on a NaNs are also dependent on the actual value of the NaN operand. In the embodiment disclosed herein, an operand value received from either the internal A operand bus 272 or the internal B operand bus 274 is forced onto round bus 276 via line 306, thereby bypassing the arithmetic units (FADD, 230 and FMUL, 241). FRND 250 receives the forced result from round bus 276 via line 307 and rounds the forced result value in accordance with any of the four rounding modes specified by ANSI IEEE Std. 754. The rounded forced result is then driven onto result bus 283 by FRND 250 via line 308.

Forced arithmetic results bypass the arithmetic unit normally associated with a given arithmetic operation (e.g., FADD 230 for addition operations and FMUL 241 for multiplication and division operations, etc.). Because forced results are generated at either FPDET 220 or FRND 250, the normally associated arithmetic operation must be canceled or inhibited to avoid the later generation of a duplicative result.

An arithmetic result forced by either FPDET 220 or FRND 250 will be produced earlier than if generated by operation of the normally associated arithmetic unit and early production of a forced result may alter the actual completion order for a given instruction sequence (including pure floating-point sequences and mixed floating- and non-floating-point sequences). Although FCNTL 262 controls pipeline scheduling for the various arithmetic units (e.g., FADD 230 and FMUL 241), out-of-order completion is managed through the use of superscalar techniques. In particular, reorder buffer 201 and reservation stations such as FRES 210 and the reservation station 203.1 of additional functional unit 203, whose operation is described above with reference to FIG. 2, mediate data dependencies despite out-of-order production of results.

In the embodiment disclosed in FIG. 3, control logic of FCNTL 262 manages pipeline scheduling and control for each of the arithmetic units of FPU 200. When a forced result is triggered in response to operand conditions detected by FPDET 220 and indicated on line 378.1, FCNTL 262 cancels the normal propagation of the associated arithmetic operation at the respective unit (e.g., FADD 230 or FMUL 241) by failing to supply a GO signal to subsequent stages of the respective unit over the respective control line (e.g., 378.5 or 378.6). Alternative embodiments may distribute portions of the pipeline scheduling and control function to the arithmetic units while remaining responsive to operand conditions detected by predetection logic such as FPDET 220. Furthermore, although the preferred embodiment frees the arithmetic pipeline for other operations, alternative embodiments may allow the scheduled operation to complete but inhibit the output of duplicative results. Freeing the arithmetic pipeline, rather than simply inhibiting output is preferred where operations may require multiple passes through stages of a pipelined arithmetic unit.

In addition to the arithmetic unit control signals provided via control lines 378.5 and 378.6, FCNTL 262 internally cancels the normal propagation of the destination tag corresponding to a canceled instruction. As previously described, FCNTL 262 receives the destination tag associated with each arithmetic operation from FRES 210. In the embodiment of FIG. 3, the destination tag is supplied via line 371.4. Normally, a destination tag propagates through a series of FCNTL 262 latches corresponding to the stages of an arithmetic pipeline (e.g., FADD 230 or FMUL 241). However, in response to a cancellation signal, FCNTL 262 diverts the destination tag associated with a forced result (i.e., the destination tag associated with an floating point instruction for which a forced result is to be produced) from the normal series of latches. Instead, the destination tag follows a shorter path through the latches of FCNTL 262 corresponding to the shorter forced result data path through FRND 250 or through FPDET 220 and FRND 250.

As a result, whether an arithmetic result is calculated in one of the arithmetic pipelines or is forced by FPDET 220 or FRND 250, the destination tag associated with the arithmetic operation propagates through the FCNTL 262 latches in lock step with progress of the operation. The destination tag is provided by FCNTL 262 to FRES 210 via line 371.5 coincident with the provision of a rounded floating point result by FRND 250 via line 308. FRES 210 drives the destination tag onto result tag bus 284 as a result tag (via line 309) and also drives the rounded result onto result bus 283 (via line 310). Result tag bus 284 and result bus 283 are signified in FIG. 3 by group 280 of external busses. Suitable designs for the latching logic of FCNTL 262 are well known in the art. Additional information, such as opcodes and flags, may be also propagated through the latches to facilitate control of the floating point unit by FCNTL 262. The embodiment disclosed herein incorporates latching logic of any suitable design and propagates opcodes and flags together with destination tags.

Figure 4:
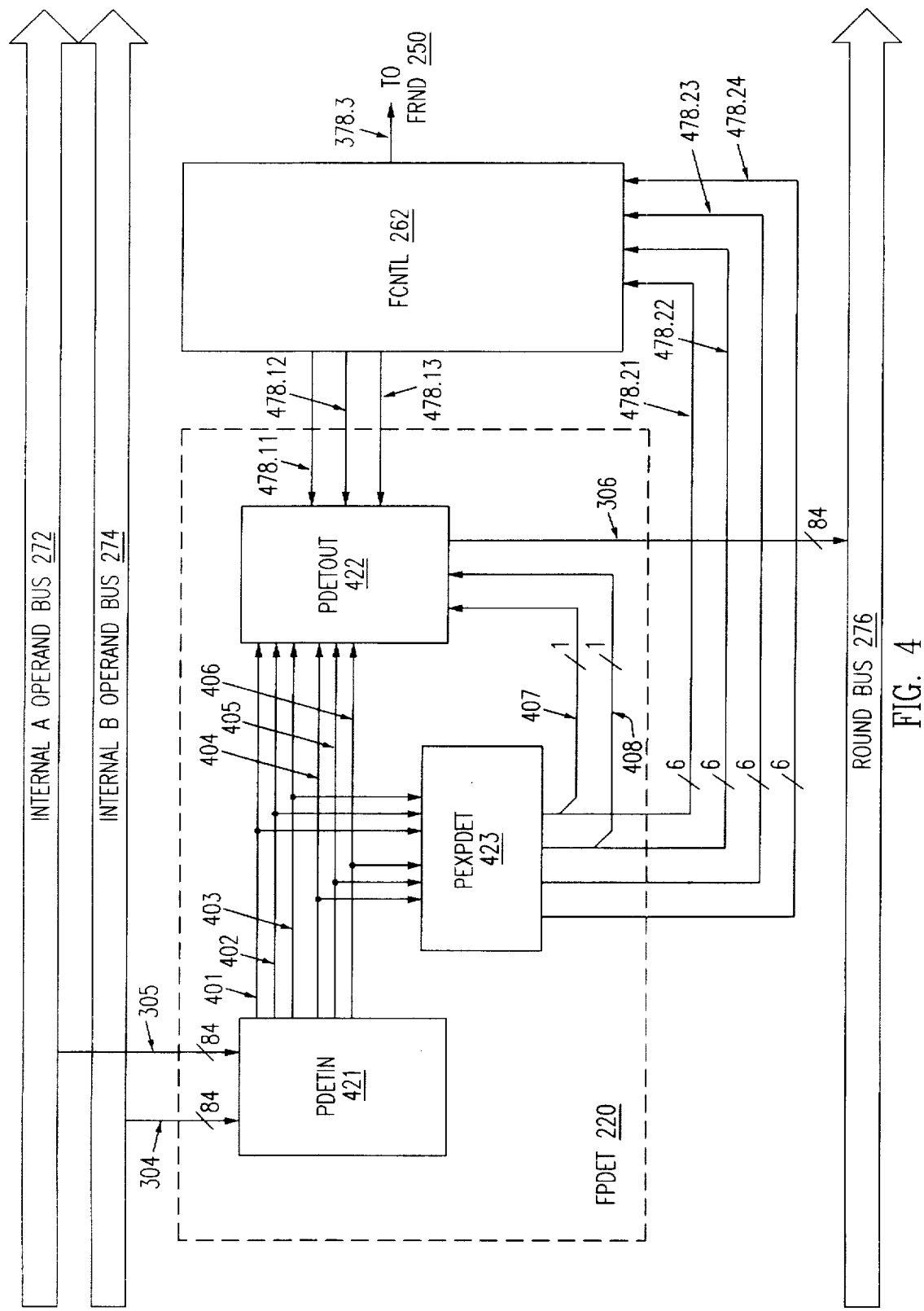
FIG. 4 is a block schematic diagram of a predetection unit with forced result generation logic constructed in accordance with the teachings of the present invention.

The operation of the predetect block, FPDET 220, is now described with reference to FIG. 4. PDETIN 421 breaks A and B operands received via lines 305 and 304 into their constituent elements (a 66-bit fraction with guard, round, and sticky bits included; a 17-bit exponent; and a hidden bit) and provides these elements to the detection module PEXPDET 423 and to the output module PDETOUT 422. In the embodiment of FIG. 4, the sign bit of an internal extended-precision operand is not represented on internal A and B operand busses 272 and 274. Instead, the sign bit of A and B operands is provided directly to FCNTL 262. As a result, PDETIN 421, receives an 84-bit representation of each operand, although internal extended-precision representations of the A and B operands are ostensibly 85-bit quantities. Alternative embodiments may explicitly represent and receive these bits or may represent floating point operand in an alternate format.

PDETIN 421 drives the 17-bit A and B operand exponents onto lines 401 and 404, respectively, and the 66-bit fractions of A and B operands onto lines 402 and 405, respectively. PDETIN 421 also drives the hidden bits for A and B operands onto lines 403 and 406, respectively.

PEXPDET 423 receives the A operand constituents provided by PDETIN 421 on lines 401, 402, and 403 and also receives the B operand constituents provided by PDETIN 421 on lines 404, 405, and 406. PEXPDET 423 characterizes each operand individually and with respect to the other, providing A and B operand characterizations to FCNTL 262 via lines 478.21 and 478.22 and providing operand comparisons via lines 478.23 and 478.24. In the embodiment disclosed in FIG. 4, line 478.21 is six bits wide, indicating six A operand characteristics. Line 478.22 is also six bits wide and indicates the same six operand characteristics, but for the B operand. These six operand characteristics include: operand equal to zero, operand equal to infinity, operand is a NaN, operand is a signaling NaN (SNaN), operand is a denormal (or pseudo denormal), operand is unsupported (e.g., pseudoinfinity, pseudoNaN, or an unnormal). Lines 407 and 408 provide PDETOUT 422 with the SNaN indications supplied on lines 478.21 and 478.22 for the A and B operands, respectively.

PEXPDET 423 also generates predetected operand comparison information which is provided to FCNTL 262 via lines 478.23 and 478.24, an indication on 478.23 signifying that the A significand (hidden bit and fraction) is the larger of the two significands and an indication on line 478.24 signifying that the B significand is the larger. Floating point number representations are well established in the art and suitable designs of logic for detecting operands matching each of the six operand characteristics and for comparing significands will be apparent to those skilled in the art. The embodiment of PEXPDET 423 disclosed herein incorporates detection and comparison logic of any suitable design. Alternative embodiments of PEXPDET 423 may also detect identical A and B significands and exponents or compare A and B exponents, supplying the results of such comparisons to FCNTL 262.

PDETOUT 422 also receives A and B operands (exponents, fractions, and hidden bits) from PDETIN 421 via lines 401-406. Normally, PDETOUT 422 does not pass either operand; however, on receiving control signals from FCNTL 262, PDETOUT 422 passes one of these operand values onto round bus 276. An FPDET2RND indication on line 478.11 causes PDETOUT 422 to drive an operand onto the round bus 276, while an FPASSAXB signal on line 478.12 selects the particular operand driven (i.e., the A operand from lines 401-403 or the B operand from lines 404-406). This path from the internal A and B operand busses, 272 and 274, to the round bus, 276, is exploited when the arithmetic result to be forced is equal to a non-zero/non-infinite operand value (e.g., a forced result of X given the operation X+0).

Several additional signals are involved in passing NaNs. Suitable encodings for NaNs are well known in the art. In the embodiment disclosed herein, NaNs are encoded with a biased exponent of all 1's, although other suitable encodings are possible. Signaling NaNs (SNaNs) are represented with the leading bit of the significand equal to 0, whereas quiet NaNs (QNaNs) have a leading significand bit equal to 1. PDETOUT 422 converts SNaNs to QNaNs unless NOCNVSNAN is asserted on line 478.13 by FCNTL 262. PDETOUT 422 performs this conversion by setting the leading bit of the significand to 1, while passing the remaining significand bits to support the propagation of diagnostic information required by ANSI IEEE Std. 754, pp. 13-14.

PDETOUT 422 receives an indication from PEXPDET 423 over line 407 if the A operand is an SNaN and over line 408 if the B operand is an SNaN. PDETOUT 422 also receives an output enable indication (FPDET2RND) on line 478.11 and a operand selection indication (FPASSAXB) on line 478.12. When output is enabled by FPDET2RND and NOCNVSNAN is asserted, PDETOUT 422 drives either a 1 or a 0 in the leading bit position of the significand on round bus 276 and passes the sign, exponent and remaining significand bits of the selected NaN operand onto round bus 276. The value driven in the leading significand bit position on round bus 276 is a 0 when the operand selected by FPASSAXB is an SNaN (as indicated by the signal on line 407 or 408) and NOCNVSNAN is asserted on line 478.13. Otherwise, PDETOUT 422 drives a 1 in the leading significand bit position on round bus 276.

Figure 5:
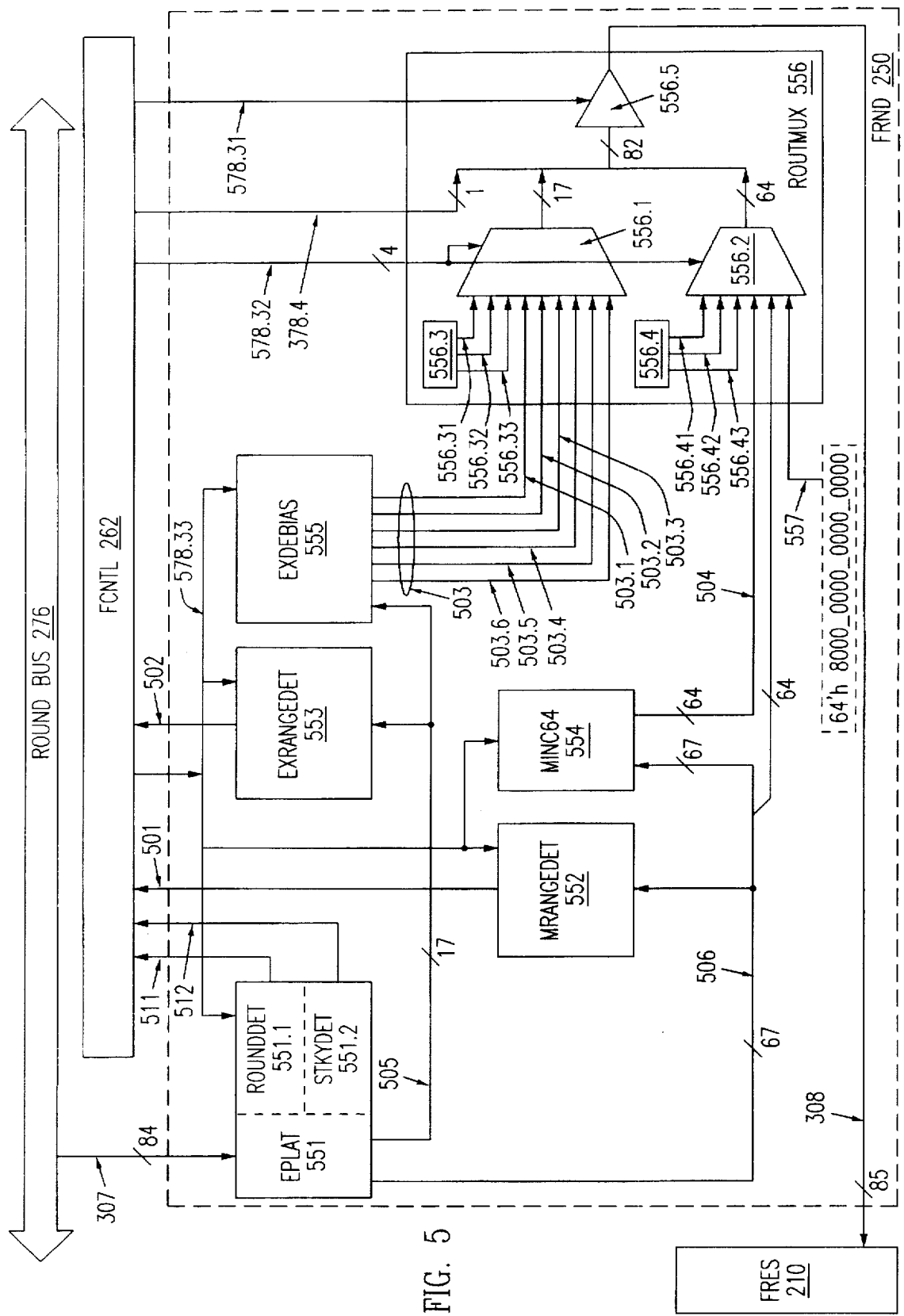
FIG. 5 is a block schematic diagram of a rounding unit with forced result generation logic constructed in accordance with the teachings of the present invention.

Referring now to FIG. 5, the operation of FRND 250 is described. FRND 250 drives arithmetic results back to FRES 210 via an 85-bit wide line 308. Two sources exist for result values which are driven back to FRES 210 by FRND 250. First, certain forced arithmetic results (e.g., a forced zero, forced infinity, or forced real indefinite values) are driven onto line 308 by FRND 250 in response to control signals received from FCNTL 262. Second, values received from round bus 276 via line 307, including values forced (i.e., passed) by FPDET 220 and values received from the arithmetic units (FADD 230 and FMUL, 241) are rounded in accordance with ANSI IEEE Std. 754 and driven back to FRES 210 by FRND 250 in response to control signals received from FCNTL 262. FRND 250 includes the following functional blocks: ROUTMUX 556, EPLAT 551, MRANGEDET 552, EXRANGEDET 553, MINC64 554, and EXDEBIAS 555.

The output multiplexer, ROUTMUX 556, implements logic to select the significand and exponent constituents corresponding to a rounded result value, while the remaining functional blocks are responsible for supplying candidate result constituents corresponding to the floating point value received from round bus 276 and in accordance with the IEEE rounding mode selected and with possible numerical overflow or underflow situations. ROUTMUX 556 selects from candidate constituents supplied by the other functional blocks and from internally generated constituents corresponding to result values (e.g., ±0, ±∞, and ±real indefinite) forced by FRND 250. The selected constituents, together with the result sign received via line 378.4, are supplied as a result value on line 308.

Forced result values are generated as follows. A RND2RES indication on line 578.31 enables line driver 556.5 of ROUTMUX 556 to drive a result value onto line 308. In the embodiment described herein, line 308 is driven each cycle although alternative embodiments could selectively drive line 308. Selection signals on line 578.32 select the particular exponent and significand driven by ROUTMUX 556. Illustratively, two multiplexers, an exponent multiplexer 556.1 and a significand multiplexer 556.2, select the desired exponent and significand in response to selection signals received on line 578.32. Alternative multiplexing schemes are also suitable. For example, combined exponent and mantissa selection logic or multiple levels of multiplexers are also suitable. Exponent and significand constituents for each forced arithmetic result value are supplied internal to ROUTMUX 556. Forced exponent logic 556.3 supplies a representation of the exponent constituent for each result forced by FRND 250. Exponents for floating point representations of zero, infinity, and real indefinite are supplied on lines 556.31, 556.32, and 556.33, respectively. Similarly, forced significand logic 556.4 supplies a representation of the significand constituent for each result forced by FRND 250. Significands for floating point representations of zero, infinity, and real indefinite are supplied on lines 556.41, 556.42, and 556.43, respectively. ROUTMUX 556 also receives a result sign signal from FCNTL 262 via line 378.4. This sign is combined with the selected exponent and significand representations, and the resulting combination is driven onto line 308 by line driver 556.5 as a forced arithmetic result. In the forced result mode of operation, values presented on round bus 276 are ignored.

Line driver 556.5 supplies an 82-bit rounded result (i.e., an internal, extended-precision result without "r," "g," and "st" bits) to FRES 210 via line 308. FRES 210 includes steering logic (not shown, but see co-pending application Ser. No. 08/533,725, entitled "Reservation Station for a Floating Point Processing Unit" and naming Goddard et al. as inventors, filed on 26 Sep., 1995 and incorporated herein by reference, which discloses suitable steering logic). In accordance with the particular format selected (e.g., single-, double-, or extended-precision) FRES 210 steers the sign, exponent, and significand bits supplied into the positions prescribed by the definitions of each floating point format. Bit assignments for floating point formats (including single-, double-, and extended-precision floating point representations) are described in ANSI IEEE Std. 754 and suitable designs for steering logic are well known in the art.

In the embodiment disclosed herein, selection line 578.32 is 4 bits wide and encodes selections of a forced zero, a forced infinity, and a forced real indefinite. Other encodings are used to control FRND's rounding mode of operation. Also in the embodiment disclosed, zeros, infinities, and real indefinite are forced by FRND 250. Selection logic to support other forced values may also be implemented if desired. For example, an alternative embodiment (not shown) also implements forced 1's (e.g., as the forced result of a $cos(0)$, $cosh(0)$, $e^0$, $x^0$, or $tanh(\infty)$ operation).

In its rounding mode of operation, FRND 250 receives an unrounded result value from round bus 276 and rounds the value in accordance with ANSI IEEE Std. 754. Unrounded result values received by FRND 250 include those supplied by the arithmetic unit bypass operation of FPDET 220 (e.g., X in the case of an X+0 operation) and those supplied by an arithmetic unit (e.g., FADD 230 and FMUL 241). FRND 250 may also receive unrounded constant values from an addressable constant store in FRES 210 via the bypass path of FPDET 220. For rounding mode operations, ROUTMUX 556 selects exponent and significand constituents corresponding to the value received from round bus 276, but rounded in accordance with ANSI IEEE Std. 754. Selection of the rounded result value, rather than a forced result, is indicated by signals received on selection line 578.32.

Logic for generating rounded results is of any design suitable for rounding in accordance with ANSI IEEE Std. 754. In the embodiment disclosed herein, EPLAT 551, MINC64 554, and EXDEBIAS 555 generate versions of the significand and exponent constituents to support the possible rounding conditions and destination formats; ROUTMUX 556 selects a particular significand and exponent according to signals received from FCNTL 262 via selection line 578.32.

EPLAT 551 receives a floating point value from round bus 276 in internal extended-precision format and breaks the value into its constituent elements (i.e., a 17-bit exponent and a 67-bit significand including the hidden bit, fraction, guard bit, round bit, and sticky bit). In the embodiment of FIG. 5, the sign bit of the floating point value is not explicitly represented on round bus 276. Instead, the result sign is provided directly to ROUTMUX 556 by FCNTL 262 via line 378.4. As a result, EPLAT 551, receives an 84-bit representation of floating point values, although internal extended-precision representations are ostensibly 85-bit quantities. EPLAT 551 presents the exponent and significand constituents on busses 505 and 506.

EPLAT 551, ROUNDDET 551.1, and STKYDET 551.2 receive a result format indication via line 578.33. In the embodiment of FIG. 5, extra bits of the significand supplied on bus 506 (beyond those defined by the result format) are set to zero. For example, the lower 43 bits for a single-precision result and the lower 14 bits for a double precision result are set to zero. ROUNDDET 551.1 and STKYDET 551.2 identify guard, round, and sticky bits from the floating point value received and supply FCNTL 262 with indications on lines 511 and 512, respectively. ROUNDDET 551.1 supplies an indication of the guard bit and STKYDET 551.2 supplies an OR(round bit, sticky bit) indication.

MINC64 552 generates an incremented version of the significand value received from internal bus 506. The incremented version is supplied on line 504 and is generated as follows. MINC64 truncates the significand received from internal bus 506 to the width specified for a significand of the desired result format and increments the truncated significand. For example, if a single-precision result is selected, the 67-bit internal extended-precision significand is truncated to 24-bits and a 1 is added in the lowest order bit position. The result format (e.g., single-, double-, or extended-precision format) is indicated by FCNTL 262 on line 578.33 and the incremented significand is supplied to ROUTMUX 556 on line 504. ANSI IEEE Std. 754 defines significand widths for single-, double-, and extended-precision formats. Support for additional formats may be implemented if desired.

EXDEBIAS 555 generates six versions of the exponent received from internal bus 505. These six version of the exponent are provided on lines represented collectively as 503 and are provided to ROUTMUX 556 as selectable exponent constituents. EXDBBIAS 555 supplies a first version on line 503.1 by adjusting the exponent bias from that of the internal extended-precision exponent received from bus 505 to correspond to that specified for the result format indicated on line 507. For example, if a double-precision result is selected, the correct biased exponent is obtained by subtracting 64,512 from the biased exponent value received on internal bus 505 ($bias_{internal\ extended-precision} - bias_{double-precision} = 65,535 - 1023 = 64,512$). A second version is supplied by EXDEBIAS 555 on line 503.2 and is equal to version one incremented by one (i.e., $version_1+1$). EXDEBIAS 555 supplies a third version by subtracting the overflow bias from the biased exponent value received on internal bus 505. Typically the overflow bias is 24,576, although any value which places the resulting exponent close to the middle of the representable range of exponent values is suitable. This third version is supplied on line 503.3. A fourth version is supplied by EXDEBIAS 555 on line 503.4 and is equal to version three incremented by one (i.e., $version_3+1$). EXDEBIAS 555 supplies a fifth version by adding the underflow bias to the biased exponent value received on internal bus 505. Underflow bias is typically 24,576, although any value which places the resulting exponent close to the middle of the representable range of exponent values is suitable. This fifth version is supplied on line 503.5. Finally, the sixth version supplied by EXDEBIAS 555 is equal to version five incremented by one (i.e., $version_5+1$) and is supplied on line 503.6.

MRANGEDET 552, EXRANGEDET 553, ROUNDDET 551.1, and STKYDET 551.2 characterize the significand and exponent constituents provided by EPLAT 551. MRANGEDET 552 provides flags indicative of the characteristics of the significand constituent received on line 506 when that significand constituent is formatted (i.e., truncated) in accordance with the result format selected on line 578.33. For example, if the result format selected is single-precision floating point, then the flags generated are those for a 24-bit single-precision significand. MRANGEDET 552 provides FCNTL 262 with indications of the most significant and least significant bits of the formatted significand constituent. Finally, MRANGEDET 552 provides FCNTL 262 with flags indicating whether the significand has overflowed or whether the sum of the formatted (i.e., truncated) significand and one overflows. Each of these indications is provided to FCNTL 262 via significand flag indicating line 501.

Similarly EXRANGEDET 553 provides flags indicative of the characteristics of the exponent constituent received on line 505 when that exponent constituent is represented within the exponent width provided by the result format selected on line 578.33. For example, if the result format selected is double-precision floating point, then the flags generated are those for a 11-bit double-precision exponent. EXRANGEDET 553 provides FCNTL 262 with numerical overflow and numerical underflow indications (i.e., whether the exponent constituent overflows or underflows the result format selected and whether the exponent constituent, when incremented by one, overflows the result format selected). Each of these indications is provided to FCNTL 262 via exponent flag indicating line 502.

Based on the exponent and significand flags provided by EXRANGEDET 553 and MRANGEDET 552, FCNTL 262 drives selection signals via line 578.32 to the exponent and significand multiplexers (556.1 and 556.2) of ROUTMUX 556. In the embodiment disclosed herein, selection line 578.32 is 4 bits wide and encodes the forced result and rounded result selections identified in Table 4.

TABLE 4

ROUTMUX Selections

| Result Section | Exponent Multiplexer (556.1) Selection | Significand Multiplexer (556.2) Selection |
|---|---|---|
| Force Zero | 556.31 | 556.41 |
| Force Infinity | 556.32 | 556.42 |
| Force Real Indefinite | 556.33 | 556.43 |
| Pass value | 503.1 | 506 |
| Round up significand | 503.1 | 504 |
| Round up significand (mantissa overflow) | 503.2 | 557 |
| [Numerical Overflow] pass value | 503.3 | 506 |
| [Numerical Overflow] round up significand | 503.3 | 504 |
| [Numerical Overflow] round up significand (overflow) | 503.4 | 504 |
| [Numerical Underflow] pass value | 503.5 | 506 |
| [Numerical Underflow] round up significand | 503.5 | 504 |
| [Numerical Underflow] round up significand (overflow) | 503.6 | 504 |

Table 4 lists each result selection and the subsidiary selections by exponent and significand multiplexers 556.1 and 556.2. For forced result selections, lines 556.31, 556.32, and 556.33 provide exponent encodings and lines 556.41, 556.42, and 556.43 provide significand encodings for zero, infinity, and real indefinite number representations respectively. In the embodiment disclosed herein, these representations are in accordance with ANSI IEEE Std. 754, although alternate formats are also possible. Forced exponent and significand constituents selected by exponent multiplexer 556.1 and significand multiplexer 556.2 are supplied on line 308 in the widest floating point result representation supported. In the embodiment disclosed herein, that widest representation is 17-bit exponent and 64-bit significand), although alternate formats are also possible. For narrower result formats (e.g., single- and double-precision), forced result exponent and significand values selected by multiplexers 556.1 and 556.2 are truncated by the steering logic of FRES 210.

The remaining result selections listed in Table 4 correspond to three major and three minor variations of results. The major variations correspond to normal results, numerical overflow, and numerical underflow, as indicated by characterizations provided by EXRANGEDET 553 and MRANGEDET 552 to FCNTL 262. The minor variations (pass value, round up significand, and round up significand where significand overflow requires the exponent to be incremented) support the effects of rounding on floating point values, where rounding is performed in accordance with rounding modes specified in ANSI IEEE Stds. 754 and 854. Exponent multiplexer 556.1 and significand multiplexer 556.2 select the exponent and significand constituents corresponding to each of these nine variations, as indicated in Table 4.

While the invention has been described with reference to various embodiments, it will be understood that these embodiments are illustrative and that the scope of the invention is not limited to them. Many variations, modifications, additions, and improvements of the embodiments described are possible. For example, changes to the supported set of forced result values are possible. Alternative embodiments may also support different or additional sets of forced or passed values. Furthermore, arithmetic pipeline designs, including larger and smaller numbers of arithmetic units are possible. Additionally, alternate floating point number representations and special value codings are possible. These and other variations, modifications, additions, and improvements may fall within the scope of the invention as defined in the claims which follow.

What is claimed is:

1. A floating point processing unit comprising:

an arithmetic unit coupled between a floating point operand source and a round bus, said arithmetic unit being responsive to a normal result indication;

operand passing logic coupled between said floating point operand source and said round bus, said operand passing logic being responsive to a pass operand indication;

rounding logic coupled between said round bus and a result bus;

a forced result store coupled at an output port of said rounding logic to supply forced results without rounding in response to a forced result indication; and operand characterization and control logic coupled to a floating point instruction source, to said arithmetic unit, to said operand passing logic, and to said forced result logic, wherein said control logic supplies one of said normal result indication, said pass operand indication, and said forced result indication, said pass operand indication and said forced result indication being supplied in response to respective first and second sets of predetermined combinations of floating point instructions and operand characterizations.

2. A floating point processing unit as recited in claim 1 wherein said operand characterization indications characterize first and second operands individually.

3. A floating point processing unit as recited in claim 2 wherein said operand characterization indications are indicative of operand conditions including operand equal to zero, operand equal to infinity, and operand is a NaN.

4. A floating point processing unit as recited in claim 2 wherein said operand characterization indications are indicative of operand conditions including operand is a denormal and operand is unsupported.

5. A floating point processing unit as recited in claim 1 wherein said operand characterization indications characterize first and second operands with respect to each other.

6. A floating point processing unit as recited in claim 5 wherein said operand characterization indications include an indication of the larger one of the significand of said first and said second operands.

7. A floating point processing unit as recited in claim 1, wherein said operand passing logic includes an arithmetic unit bypass path and said rounding logic rounds operands passed via said arithmetic unit bypass path in accordance with a result format and a rounding mode.

8. A floating point processing unit as recited in claim 1, wherein said first set of predetermined combinations includes the combination of an addition instruction and a zero operand indication.

9. A floating point processing unit as recited in claim 1, wherein said first set of predetermined combinations includes combinations of a valid one of said floating point instructions and a NaN operand indication.

10. A floating point processing unit as recited in claim 1, wherein said first set includes of predetermined combinations the combination of a partial remainder instruction and a second operand equal to ±infinity indication.

11. A floating point processing unit as recited in claim 1, wherein said second set of predetermined combinations includes combinations of said floating point instructions and operand characterization indications corresponding to ones of +infinity, −infinity, infinity, +0, −0, and 0.

12. A floating point processing unit as recited in claim 1, wherein said second set of predetermined combinations includes combinations of said floating point instructions and operand characterization indications corresponding to invalid operations.

13. A floating point processing unit as recited in claim 1, wherein said rounding logic comprises:

exponent logic coupled to said operand passing logic and said arithmetic unit, said exponent logic supplying candidate exponent values corresponding to arithmetic results rounded in accordance with ones of a predetermined set of rounding modes;

a predetermined exponent store of exponent values corresponding to ones of a predetermined set of forced results;

significand logic coupled to said operand passing logic and said arithmetic unit, said significand logic supplying candidate significand values corresponding to arithmetic results rounded in accordance with ones of said predetermined set of rounding modes, a predetermined significand store of significand values corresponding to ones of said predetermined set of forced results;

selection logic coupled to said exponent logic, to said predetermined exponent store, to said significand logic, and to said predetermined significand store, said selection logic responsive to said force predetermined result indication, wherein said force predetermined result indication is selective for significand and exponent values corresponding to selected ones of said predetermined set of forced results.

14. In a processor having a floating point instruction source, a floating point operand source, and a result bus, a floating point processing unit comprising:

an arithmetic unit coupled to said floating point operand source and to said result bus, said arithmetic unit being responsive to a normal result indication;

operand characterization logic coupled to said floating point operand source;

control logic coupled to said operand characterization logic, to said floating point instruction source, to said arithmetic unit, wherein said control logic supplies one of said normal result indication, a pass operand indication, and a force predetermined result indication, said pass operand and force predetermined result indications being supplied in response to predetermined combinations of floating point instructions and operand characterizations;

operand passing logic including an arithmetic unit bypass path coupled between said floating point operand source and said result bus, said operand passing logic also coupled to said control logic and responsive to said pass operand indication;

rounding logic coupled between said operand passing logic and said result bus and between said arithmetic unit and said result bus, said rounding logic rounding operands passed via said arithmetic unit bypass path in accordance with a result format and a rounding mode; and predetermined result forcing logic coupled to said result bus and to said control logic said predetermined result forcing logic being responsive to said force predetermined result indication and supplying without operation of said rounding logic predetermined results in accordance with said result format and said rounding mode.

15. A floating point processing unit as recited in claim 14 wherein outputs of said rounding logic and said predetermined result forcing logic are multiplexed onto said result bus.

16. A floating point processing unit comprising:

at least one floating point arithmetic data path coupled between first and second operand busses and a rounding unit;

predetection logic coupled in parallel with said at least one floating point arithmetic data path between said first and second operand busses and said rounding unit, said predetection logic coupled to pass an operand from a selected one of said first and said second operand busses in response to detection of a first combination of operands and operation thereupon, to supply forced result indications in response to detection of a second combination of operands and operation thereupon, and otherwise to neither pass an operand nor supply a forced result indication, a normal result instead being supplied by said at least one floating point arithmetic data path; and said rounding unit including logic selective for stored representations of exponent and fraction portions of a particular forced arithmetic result in response to a corresponding of said forced result indications and otherwise selective for rounded result data rounded in accordance with a current rounding mode, said rounded result data being one of a rounded version of said passed operand and a rounded version of said normal result.

17. A method of supplying floating point arithmetic results, said method comprising:

predetecting, in parallel with arithmetic result computation by at least one arithmetic pipeline, first and second combinations of operands and operation thereupon;

in response to said predetecting of said first combination of operands and operation thereupon, passing an operand from a selected one of first and said second operand busses, and thereafter rounding said passed operand in accordance with a prevailing rounding mode;

in response to said predetecting of said second combination of operands and operation thereupon, supplying, from a precomputed rounded result store, a result rounded in accordance with said prevailing rounding mode; and otherwise, supplying said arithmetic result from said at least one arithmetic data pipeline and thereafter rounding said arithmetic result in accordance with a prevailing rounding mode.

* * * * *

UNITED STATES PATENT AND TRADEMARK OFFICE
CERTIFICATE OF CORRECTION

PATENT NO. : 5,748,516
DATED : May 5, 1998
INVENTOR(S) : Goddard, Michael D.; Goveas, Kelvin D.

It is certified that error appears in the above-identified patent and that said Letters Patent is hereby corrected as shown below:

Col. 21, lines 5-10, delete "logic said predetermined result forcing logic being responsive to said force predetermined result indication and supplying without operation of said rounding logic predetermined results in accordance with said result format and said rounding mode." and insert --logic, said predetermined result forcing logic being responsive to said force predetermined result indication and supplying, without operation of said rounding logic, predetermined results in accordance with said result format and said rounding mode.--

Col. 15, line 22, delete "Mustratively" and insert --Illustratively--

Col. 17, line 7, delete "EXDBBIAS" and insert --EXDEBIAS--

Signed and Sealed this

Nineteenth Day of January, 1999

Attest:

*Acting Commissioner of Patents and Trademarks*

*Attesting Officer*